United States Patent
Ozaki

(10) Patent No.: US 6,577,974 B2
(45) Date of Patent: Jun. 10, 2003

(54) RECORDING AND REPRODUCING APPARATUS AND TIME CALIBRATION METHOD OF RECORDING AND REPRODUCING APPARATUS

(75) Inventor: Kazuyoshi Ozaki, Hyogo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 39 days.

(21) Appl. No.: 09/879,223

(22) Filed: Jun. 12, 2001

(65) Prior Publication Data

US 2002/0026290 A1 Feb. 28, 2002

(30) Foreign Application Priority Data

Aug. 31, 2000 (JP) ........................................ 2000-263429

(51) Int. Cl.[7] .......................... G04G 15/00; G01R 23/02
(52) U.S. Cl. ...................... 702/89; 324/76.19; 348/553; 360/48; 702/177
(58) Field of Search ........................ 702/79, 89, 125, 702/176–177, 187; 324/76.19; 73/1.42; 368/120, 184; 700/306; 348/553; 360/48

(56) References Cited

U.S. PATENT DOCUMENTS 5,162,723 A * 11/1992 Marzalek et al. ........ 324/76.19

6,028,726 A * 2/2000 Yanagihara ................... 360/48
6,433,831 B1 * 8/2002 Dinwiddie et al. ......... 348/553

FOREIGN PATENT DOCUMENTS

| JP | 4-108284 | 4/1992 |
| JP | 2000-131471 | 5/2000 |

* cited by examiner

Primary Examiner—Bryan Bui
Assistant Examiner—John Le
(74) Attorney, Agent, or Firm—RatnerPrestia

(57) ABSTRACT

In a recording and reproducing apparatus, and in a time calibration method of the recording and reproducing apparatus, first and second clock units are provided for counting time. A time extraction unit extracts time information included in a received broadcast signal. Also included in the recording and reproducing apparatus is a time setting unit for manually setting the time of the first clock unit. From the extracted time information, the time of the second clock unit is calibrated. And if the time information is extracted within a specific interval, manual time setting of the time setting unit is prohibited, and the time of the first clock unit is calibrated by the time of the second clock unit. But if the time information is not extracted within the specific interval, manual time setting by the time setting unit is allowed, and the time of the second clock unit is calibrated by the time of the first clock unit.

2 Claims, 2 Drawing Sheets

RECORDING AND REPRODUCING APPARATUS AND TIME CALIBRATION METHOD OF RECORDING AND REPRODUCING APPARATUS

BACKGROUND OF THE INVENTION

1. Field of the Invention

The present invention relates to a recording and reproducing apparatus having an internal clock.

2. Description of the Related Art

Hitherto, the internal clock of a recording and reproducing apparatus tells the time by counting the reference clocks. When the time is deviated, the user sets the time manually.

As an automatic time calibration method of an internal clock, a method to adjust according to a broadcast time tone is known.

In this case, however, the time tone is broadcast only several times a day, and the time is not calibrated while the recording and reproducing apparatus is in record reservation, recording or reproducing state. If not calibrated for a long time in such a case, the time may be deviated. If recording is reserved in time deviation state of the internal clock, the beginning or ending portion of a program may not be recorded.

Besides, since the time tone does not include time data, it is hard to calibrate if the broadcast time of time tone and the time of the internal clock of the recording and reproducing apparatus are deviated by several minutes. For example, when the time is advanced by one hour in daylight saving time, the time cannot be calibrated. It is also difficult to calibrate if a wrong time is set in the internal clock by manual setting by the user.

SUMMARY OF THE INVENTION

The invention is devised in the light of the prior art, and the recording and reproducing apparatus of the invention comprises a time extraction unit for extracting the time information included in the received broadcast signal, a clock unit for counting the time, and a time setting unit for setting the time of the clock unit manually. By the extracted time information, the time of the clock is calibrated, and while the time information is extracted within specific intervals, manual time setting by the time setting unit is prohibited.

The time calibration method of recording and reproducing apparatus of the invention comprises (a) a step for extracting the time information included in the received broadcast signal, (b) a step for calibrating the time of the clock unit by the time information extracted at step (a), (c) a step for measuring the extraction intervals of the time information extracted at step (a), and (d) a step for prohibiting manual time setting of the clock unit when the extraction intervals measured at step (c) are within specific intervals.

DESCRIPTION OF THE PREFERRED EMBODIMENT

Figure 1:
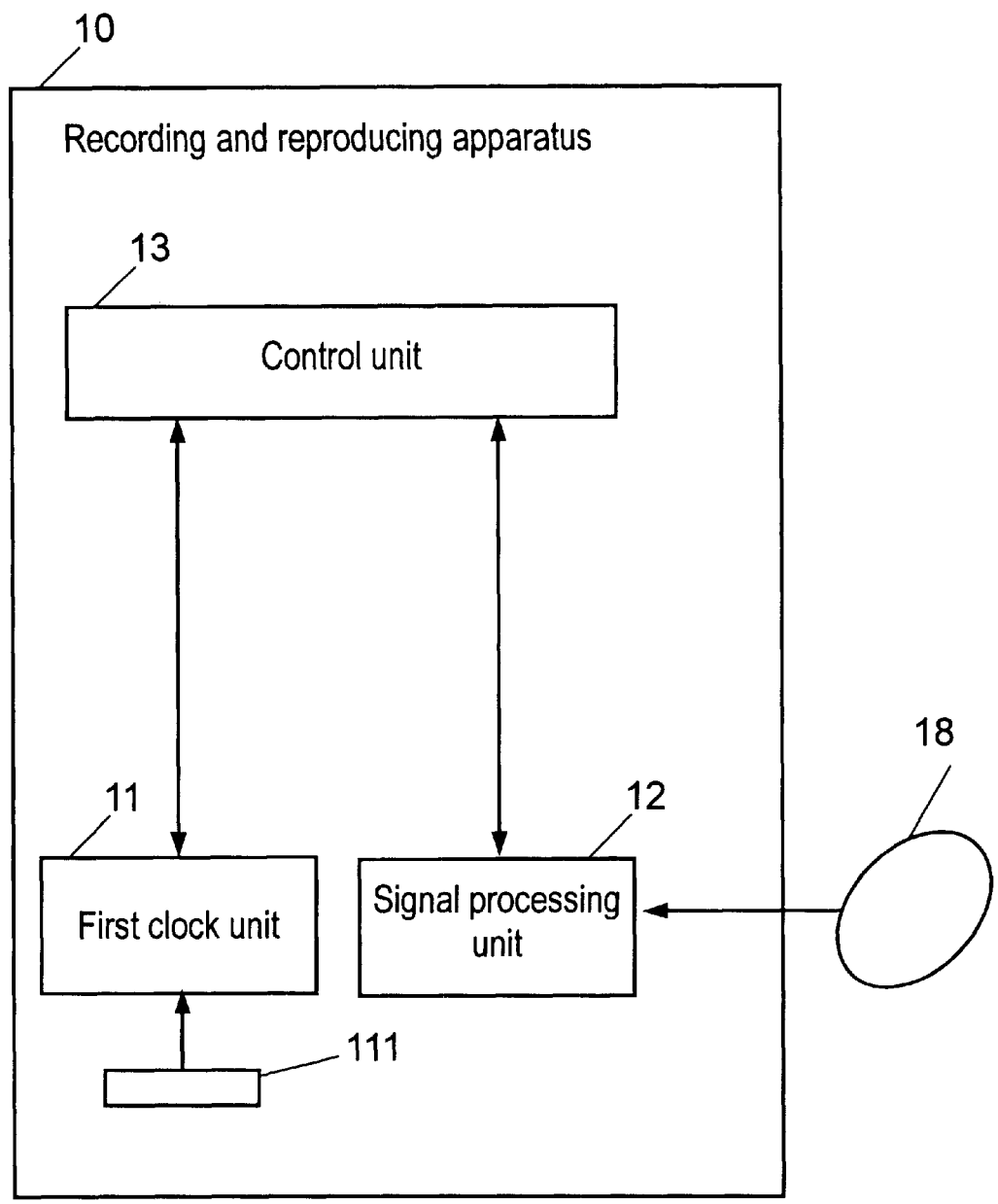
FIG. 1 is a block diagram showing a configuration of a recording and reproducing apparatus in embodiment 1 of the invention.

A preferred embodiment of the invention is described by referring to the drawings.

(Embodiment 1)

FIG. 1 is a block diagram showing a configuration of a recording and reproducing apparatus in embodiment 1 of the invention. A recording and reproducing apparatus 10 such as video tape recorder comprises a first clock unit 11 composed of microcomputer or the like, a signal processing unit 12 such as set top box (STB), a control unit 13, and a manual time setting unit 111.

The signal processing unit 12 analyzes MPEG2 stream from a broadcast station received by a digital broadcast receiving antenna 18, and extracts time information, for example, time offset table (TOT). The TOT is to transmit the "standard time" of a certain district, and the "time offset value" during daylight saving time. The standard time is transmitted so as to reach the receiver within an error of ±500 ms of the true standard time. The time offset value is inserted in the TOT during daylight saving time. It is not inserted in the TOT during the non-daylight saving time.

The extracted time information is sent to the control unit 13. The control unit 13 sends the time information sent from the signal processing unit 12 to the first clock unit 11, and measures the intervals of the transmission. The first clock unit 11 measures the time, and calibrates the time according to the time information sent from the control unit.

The time measured in the first clock unit 11 is sent to the signal processing unit 12 through the control unit 13. A second clock unit (not shown) in the signal processing unit 12 sets the time according to the time information as far as it is sent from the broadcasting station, and sets the time according to the time of the first clock unit 11 when time information is not transmitted. The time of the second clock unit (not shown) in the signal processing unit 12 is used for reservation of recording.

Figure 2:
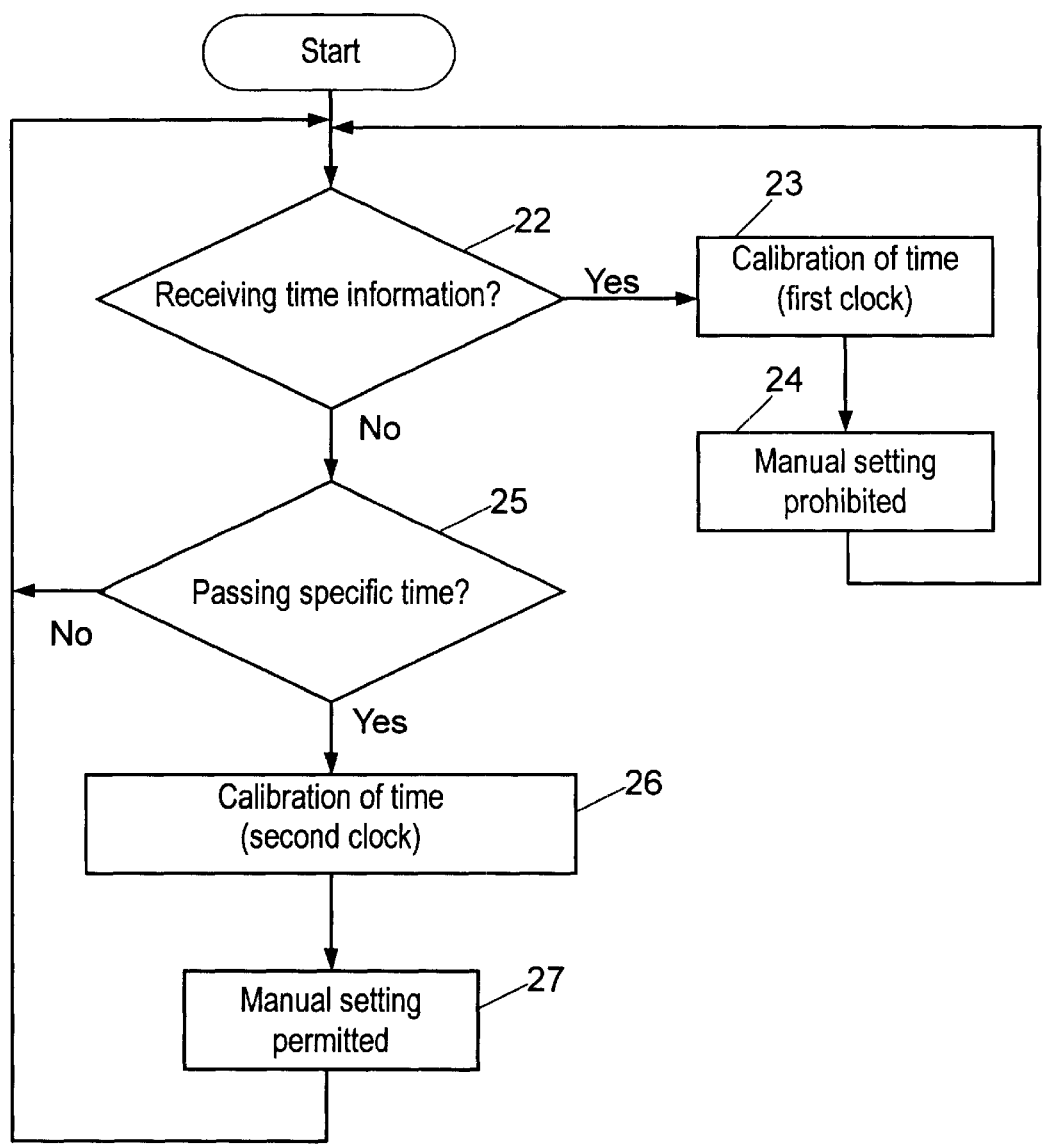
FIG. 2 is a flowchart for explaining the time calibration of the recording and reproducing apparatus in embodiment 1 of the invention.

In the recording and reproducing apparatus having such configuration, the time control is explained below by referring to FIG. 2.

Step 22: To judge if receiving or not the time information in the digital broadcast signal such as MPEG2 stream transmitted from a broadcasting station. To go to step 23 if receiving, or to step 25 if not receiving.

Steps 23, 24: The signal processing unit 12 sends the time information received from the broadcasting station to the first clock unit 11 by way of the control unit 13. The first clock unit 11 sets the time according to the time information sent from the broadcasting station. As a result, the time of the first clock unit 11 is corrected.

At the same time, at step 24, the control unit 13 prohibits time adjustment of the first clock unit 11 by the manual time setting unit 111. That is, by prohibiting manual time setting by the user, wrong setting is prevented.

Step 25: The control unit 13 judges if a specific time has passed since the time information from the broadcasting station has not received. If passing the specific time, the process goes to step 26. If not passing, the process returns to step 22.

Step 26: The first clock unit 11 notices the measured time to the signal processing unit 12 through the control unit 13. The signal processing unit 12 sets the time according to the time noticed through the control unit 13. Then the process goes to step 27.

Step 27: Manual time setting by the user is permitted. That is, the user manipulates the manual time setting unit 111, and can set the time of the first clock unit 11.

Thus, according to the embodiment, by calibrating the internal clock of the recording and reproducing apparatus according to the time information sent from the broadcasting station, the following effects are obtained.

(1) In reservation of recording of a program, the program start is accurately detected by the program information (program name, program start time, duration, etc.) transmitted from the broadcasting station synchronously with the time information, and recording can be started at exact time and finished at exact time.

(2) If the daylight saving time starts, the internal clock of the recording and reproducing apparatus is calibrated according to the time information from the broadcasting station, so that it is not necessary to set the clock manually.

(3) By prohibiting manual time setting by the user while receiving the time information from the broadcasting station, wrong setting of time can be prevented.

What is claimed is:

1. A recording and reproducing apparatus comprising:
   a time extraction unit for extracting time information included in a received broadcast signal;
   a first clock unit for counting time;
   a second clock unit for counting time; and
   a time setting unit for setting the time of the first clock unit,
   wherein by the extracted time information, the time of the second clock unit is calibrated, and if the time information is extracted within specific interval, manual time setting by the time setting unit is prohibited, and the time of the first clock unit is calibrated by the time of the second clock unit, and
   if the information is not extracted within the specific interval, manual time setting by the time setting unit is permitted, and the time of the second clock unit is calibrated by the time of the first clock unit.

2. A time calibration method of recording and reproducing apparatus having a first clock unit and a second clock unit, the method comprising the steps of:
   (a) extracting a time information included in a received broadcast signal;
   (b) calibrating time of the second clock unit by the time information extracted at step (a);
   (c) calibrating time of a first clock unit by the time of the second clock unit calibrated at step (b);
   (d) measuring an extraction interval of the time information extracted at step (a);
   (e) prohibiting manual time setting of the first clock unit when the extraction intervals measured at step (d) is within a specific interval; and
   (f) permitting manual time setting of the first clock unit and calibrating time of the second clock unit by the time of the first clock unit when the extraction interval measured at step (d) is within the specific interval.

* * * * *